Feb. 19, 1929.
O. L. SMITH
1,702,525
SPREADING MACHINE
Filed March 8, 1926
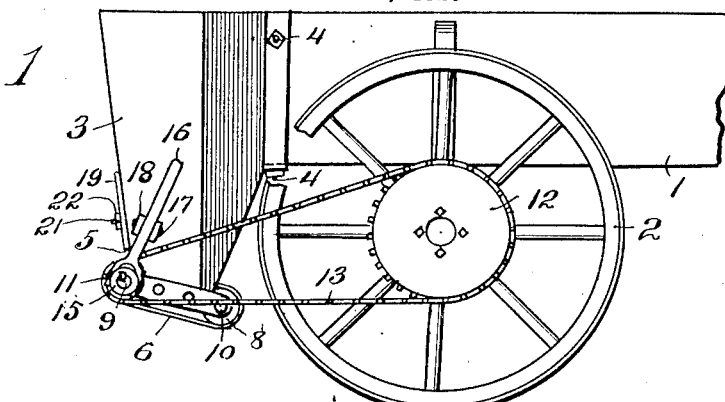
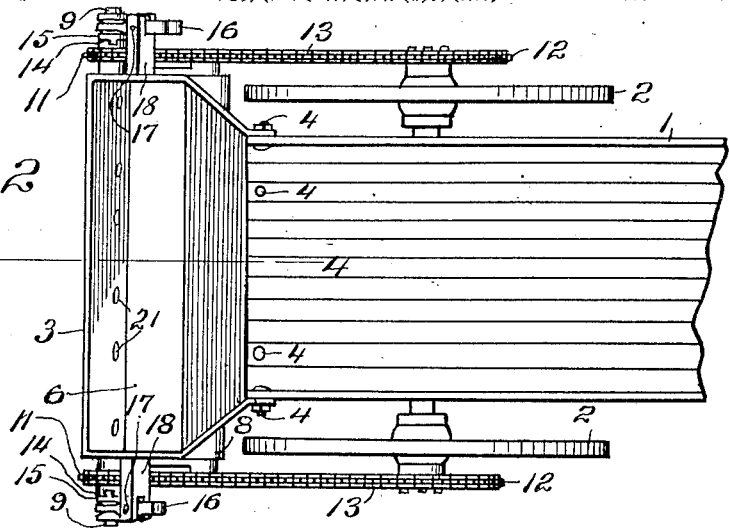
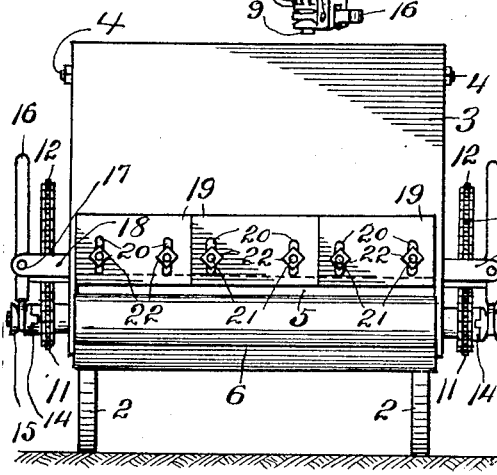
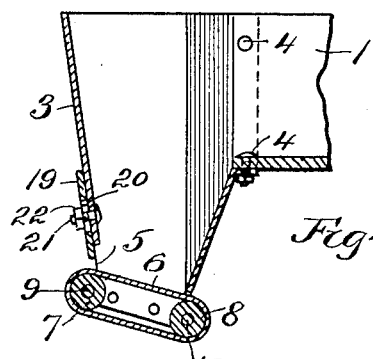
INVENTOR.
Oliver L. Smith,
BY Warren D. House
His ATTORNEY.

Patented Feb. 19, 1929.

UNITED STATES PATENT OFFICE.

OLIVER L. SMITH, OF KANSAS CITY, KANSAS.

SPREADING MACHINE.

Application filed March 8, 1926. Serial No. 93,119.

My invention relates to improvements in spreading machines. It relates particularly to spreading machines which are adapted to spread crushed rock, grit, etc. on roadway paving which is under construction, or to spread fertilizing material over land.

One of the objects of my invention is to provide a spreading machine of the kind described, which is novel, simple in construction and operation, strong, durable, not liable to get out of order, which is efficient and which may be readily attached to a vehicle, such as a wagon or automobile truck.

A further object of my invention is the provision of novel mechanism for effecting the discharge of the material to be spread from the hopper containing such material.

My invention provides further novel means for adjustably varying the width and thickness of the sheet of material which is discharged from the hopper.

The novel features of my invention are hereinafter fully described and claimed.

In the accompanying drawing which illustrates the preferred embodiment of my invention, Fig. 1 is a side elevation, partly broken away of a vehicle to which my improved spreader is shown applied.

Fig. 2 is a top view of the same.

Fig. 3 is an end elevation of the same.

Fig. 4 is a section on the line 4—4 of Fig. 2.

Similar reference characters designate similar parts in the different views.

1 designates the body of a vehicle, such as a wagon or truck, and 2 the usual rear carrying wheels.

3 designates a hopper for containing the material to be spread. This hopper is attached to the sides and bottom of the body 1 by bolts 4.

When the machine is to be used to spread grit, gravel or crushed rock over a layer of tar or asphalt, the vehicle, if it is a wagon or truck is backed during the spreading operation, so that the wheels of the vehicle will not contact with uncovered tar or asphalt. In such case, the side of the hopper distant from the body 1 is provided with a discharge opening 5.

6 designates an endless belt which is mounted on two horizontal transverse rollers 7 and 8, the shafts 9 and 10 of which are rotatably mounted in opposite sides of the hopper 3. The roller 7 is the roller which drives the belt 6, and the roller 8 is an idle roller.

In order to support material in the hopper to be spread, the upper side of the belt 6 extends across the hopper below the opening 5 and inclines upwardly toward said opening. Such inclination of the upper side of the belt serves to prevent liability of the material choking the opening 5.

For driving the belt 6 so that its upper side shall move toward the opening 5, opposite ends of the shaft 9 of the roller 7 have respectively rotatable on them two sprocket wheels 11 which are respectively connected with sprocket wheels 12 respectively fastened to the vehicle wheels 2 by chain belts 13. Outer ends of the hubs of the sprocket wheels 11 are provided respectively with clutch teeth 14 with which are adapted to respectively engage two clutch members 15, which are longitudinally slidable on the shaft 9, but which are splined thereon, so as to rotate therewith. Two levers 16 respectively engage the two clutch members 15 for forcing the latter into or out of engagement with the toothed hubs of the sprocket wheels 11.

The levers 16 are respectively pivoted by pins 17, which are transverse to the shaft 9, to two brackets 18 respectively fastened to opposite outer sides of the hopper 3.

When the upper ends of the levers 16 are forced outwardly to the positions shown in Fig. 3, the clutch members 15 will be engaged with the hubs of the sprocket wheels 11.

For adjustably varying the thickness and width of the sheet of material discharged through the opening 5, I provide gates comprising flat plates 19, which are upwardly and downwardly slidably adjustable, on the side of the hopper distant from the body 1, across the opening 5. Each plate 19 has two vertical slots 20 through which respectively extend bolts 21, the heads of which bear on the inner side of the hopper 3, and the outer ends of which have respectively mounted thereon nuts 22 which bear against the outer side of the hopper.

By loosening the nuts 22, the plates 19 may be adjusted independently of each other to the desired positions, and then held in such positions by tightening the nuts. If it is desired to narrow the sheet of material discharged through the opening 5, one or two adjacent plates 19 may be adjusted so as to just clear the belt 6, so that no material will be carried under them by the belt from the hopper.

In the operation of the machine, if it is a truck or wagon body which supports the hopper 3, the truck or wagon is backed, thus making the end having the hopper thereon the front, and causing the wheels 2 to be revolved counterclockwise, as viewed in Fig. 1. This will cause the upper side of the belt 6 to move in the direction of travel of the vehicle, so that material carried on the belt will be discharged through the opening 5 onto the roadway in advance of the wheels 2, the parts connecting said wheels with the roller 7 being operatively engaged.

When it is desired to move the vehicle from place to place without spreading material from the hopper, the levers 16 are swung to disengage the clutch members 15 from the sprocket wheels 11, upon which the latter will revolve on the shaft 9, and the latter will not revolve.

The material to be spread may be loaded in the body 1 and shoveled therefrom into the hopper 3, the end of the body 1 being open.

I do not limit my invention to the structure shown and described, as many modifications, within the scope of the appended claim, may be made without departing from the spirit of my invention.

What I claim is:—

In a spreading machine of the kind described, a vehicle having a carrying wheel, a hopper carried by said vehicle and having a discharge opening at the rear of said wheel, an endless belt at the bottom of said hopper adapted to carry on its upper side material in the hopper to be spread and inclined upwardly to and through said opening and arranged to discharge the material through said opening, driving means supporting said belt, and means driven by said wheel for operating said belt driving means to drive the upper side of said belt upwardly when the vehicle is backed.

In testimony whereof I have signed my name to this specification.

OLIVER L. SMITH.